United States Patent Office 3,287,931
Patented Nov. 29, 1966

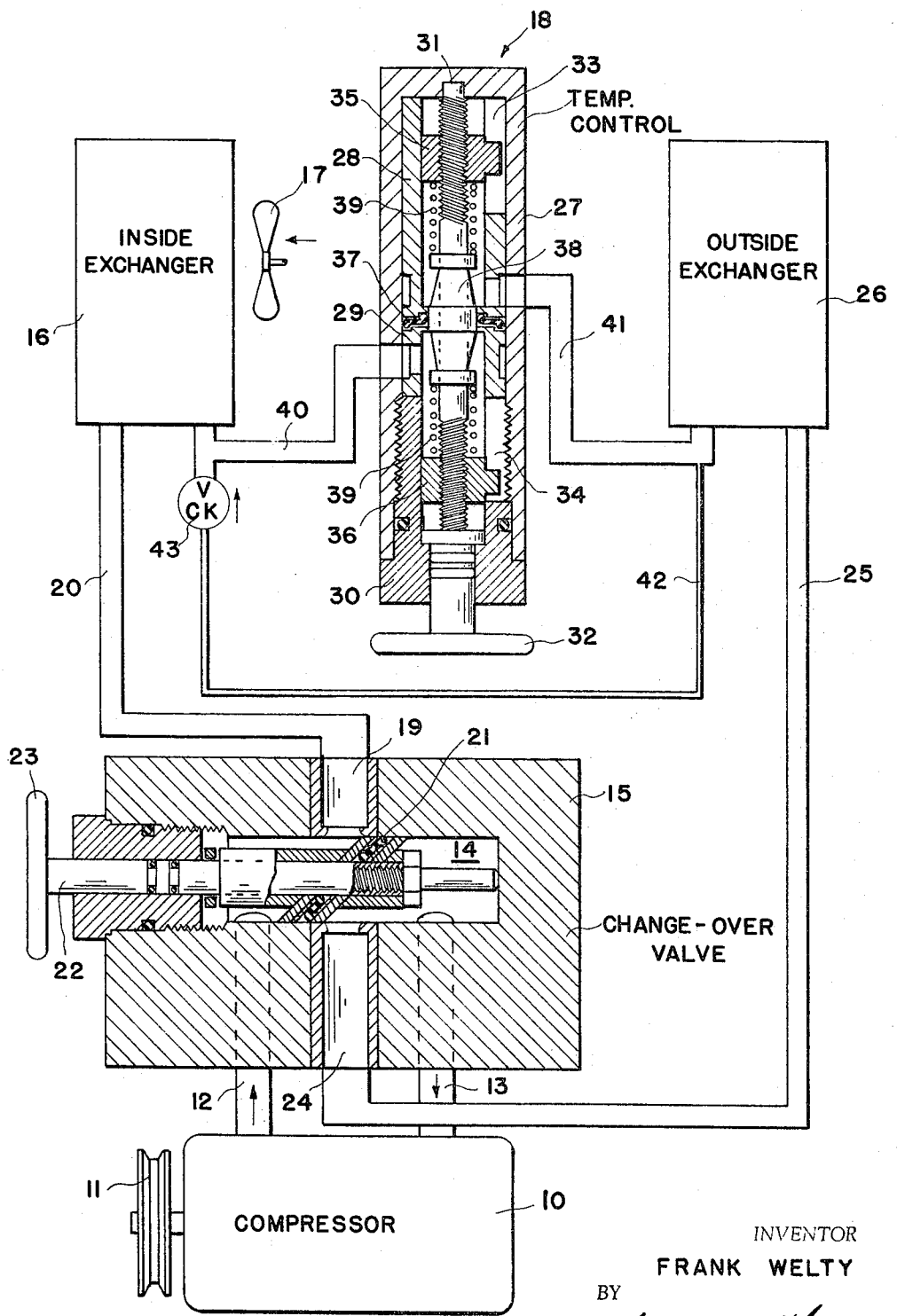

3,287,931
HEATING AND COOLING SYSTEM FOR MOTOR VEHICLES
Frank Welty, Youngstown, Ohio., assignor to The Vendo Company, Kansas City, Mo., a corporation of Missouri
Filed Apr. 5, 1965, Ser. No. 445,341
5 Claims. (Cl. 62—324)

This invention relates to a mechanical combined heating and cooling system for motor vehicles, and principally to the simplification of such systems and improvements in their control. It is now common practice to employ entirely separate systems to heat the occupied space of a motor vehicle during the winter months and to air-condition or cool the space during the summer months. This is uneconomical both as to cost and space, and accordingly, some proposals have already been made to combine the systems whereby during the winter months the heat exchanger located within the occupied space of the vehicle and which ordinarily would serve as an air-cooling refrigerant-evaporating unit serves as an air-heating and refrigerant-condensing unit. In the systems as now proposed, however, the operation is on the heat-pump principle—i.e. extracting heat from the exchanger placed in front of the engine-cooling radiator of the vehicle and pumping the same to the exchanger in the occupied space—and this has been found to be entirely too slow-starting and inefficient in severe weather conditions.

The principal object of the present invention is to provide a combined heating and cooling system for the purpose indicated which retains its maximum efficiency of operation when on the cooling cycle but which is also highly efficient and quick-acting when switched over to its heating cycle. A further object of the invention is the attainment of these objectives while yet requiring only a single heat exchanger in the occupied space of the motor vehicle and with a minimum addition of control instrumentalities for changing over from the heating cycle to the cooling cycle but which is also highly efficient and quick-acting when switched over to its heating cycle. A further object of the invention is the attainment of these objectives while yet requiring only a single heat exchanger in the occupied space of the motor vehicle and with a minimum addition of control instrumentalities for changing over from the heating cycle to the cooling cycle and vice versa.

Other objects of the invention is the provision of simplified and improved means for changing over from one cycle to the other and of simplified and efficient means to control the temperature of the exchanger in the occupied space of the vehicle whether the system is on its cooling cycle or on its heating cycle.

The above and other objects and advantages of the invention will become apparent upon consideration of the following specification and the accompanying drawing wherein there is illustrated, principally in schematic outline, a preferred embodiment of the invention.

The sole figure of the drawing is intended to represent a combined mechanical heating and cooling system constructed in accordance with the principles of the invention, the conventional components being labeled but illustrated only in schematic outline and the special equipment necessitated by the invention being shown more in detail.

In the the drawing, reference numeral 10 designates a refrigerant compressor which, in accordance with usual practice, is mounted on the automotive vehicle engine, not shown, and driven by a belt pulley 11. The latter may have incorporated with it an electric clutch, also not shown, if the same is deemed desirable for control purposes as will be understood by those familiar with the art. The compressor has an outlet port or conduit 12 and an inlet port or conduit 13 which lead to a chamber 14 in a changeover valve body 15. The system of this invention also includes, of course, a heat exchanger 16 which is mounted within the occupied space of the vehicle, and associated with this exchanger is a motor driven fan 17 by which air to be heated or cooled is forced through the exchanger 16. It will be understood that in accordance with the principles of this invention the exchanger 16 is used as an evaporator when the system is on its cooling cycle and as a compressed refrigerant receiver and condenser when the system is on its heating cycle.

At this point, it should be explained that the temperature attained by the exchanger 16 when the system is on heating is a conversion of the heat imparted to the compressed refrigerant by the mechanical action of the compressor 10. In a representative installation the compressor 10 may convert mechanical energy into heat energy in the refrigerant of the order of 5–7 horsepower which has been found to be sufficient to effect rapid and adequate heating of the occupied space in the ordinary motor car, for example. This power capability is also sufficient to exert adequate refrigerating capacity when the system is on its cooling cycle. Obviously, energy generation and conversion of this magnitude cannot be achieved unless an adequate back pressure is maintained in the exchanger 16, and in accordance with the principles of this invention I provide such back pressure by a pressure and flow impedance which is built into a temperature control unit 18. As will appear hereinafter the impedance provided by device 18 is of significant advantage because it maintains the desired pressure and temperature of the exchanger 16 even though the driving engine of the vehicle is merely idling. Also, the arrangement permits the exchanger 16 to reach its upper operating temperature very quickly after initial starting of the engine.

Communicating with the chamber 14 in valve 15 is a centrally disposed port 19 which is connected to one of the two refrigerant ports of the exchanger 16 by means of conduit 20. Chamber 14 is cylindrical and rotatably received therein is a slanting seal 21 carried by a rod 22. The latter, in turn, is provided with an operator 23 which, in actual practice, is provided with a suitable actuator or extension whereby the driver of the motor vehicle may readily reverse the valve 15 from its normal driver's position. In the position of the parts shown the compressor outlet 12 is connected with the port 19 while the compressor inlet 13 is connected to a second port 24 in valve 15 which is diametrically opposite the port 19. This second port is connected through conduit 25 to one of the refrigerant ports of a heat exchanger 26 which is positioned outside the occupied space of the vehicle and normally directly in front of the vehicle engine cooling radiator.

The structure and operation of the valve 15 is more fully disclosed and claimed per se in my co-pending application Serial No. 487,498 filed September 15, 1965. It should be obvious that rotation of shaft 22 through 180° from the position shown in the drawing will rotate or flop over the seal 21 so that thereafter the conduit 12 is connected to the port 24 while the port 19 is connected to the conduit 13.

As illustrated, valve 15 is switched over for heating and the compressed refrigerant goes directly from the compressor to the inside exchanger 16 under a controlled back pressure as explained above, and the outside exchanger 26 merely serves as a refrigerant reservoir and evaporator to supply refrigerant to the compressor through port 24, chamber 14, and conduit 13, in series. To switch over the system for cooling, the rod or shaft 22 is rotated 180° by the operator 23 thereby connecting the outlet of the compressor to the conduit 25 and the inlet with the conduit 20 as will be understood. Thereafter, the exchanger 26 acts as the condenser while the exchanger 16 serves as the evaporative cooler inside the occupied space of the vehicle for cooling such space.

The combined pressure impedance and temperature control unit 18 comprises a tubular member 27 having tubular inserts 28 and 29, and a screw threaded end insert 30. Journaled in the closed end of member 27 and in the insert 30 is a double-ended screw 31, one end portion of which is reversely threaded with respect to the other end portion, and this screw 31 is provided with an operator 32 by which the screw may be rotated by the vehicle operator from his driver seat in a convenient manner. Inserts 28 and 30 are longitudinally slotted as shown at 33 and 34, respectively, to receive integral lugs on nuts 35 and 36, respectively, which are screw-threadably received on the screw 31. The screw 31 is held against axial movement so that upon its rotation the nuts 35 and 36 will move either toward or away from each other, depending on the direction of rotation of the screw.

Clamped between the inserts 28 and 29 is a valving ferrule 37 which is made of rubber or plastic material, and slideably but snugly received within this ferrule is a double conical valving element 38 which is slideable on the rod 31. Element 38 is centered and yieldably restrained against sliding movement in either direction by coil springs 39 which are carried on the screw 31 intermediate the element 38 and the nuts 35 and 36. Insert 29 and housing 27 are provided with aligned ports which are connected to a conduit 40 leading to the second refrigerant port of the inside exchanger 16. Similar aligned ports in the insert 28 and the casing 27 are connected to a conduit 41 which leads to the second of the refrigerant ports of the outside exchanger 26. Completing the physical structure of the system is a restriction line 42 which leads from the said second of the refrigerant ports of exchanger 26 through a check valve 43 to the said second of the refrigerant ports of the heat exchanger 16.

It will be obvious upon consideration of the structure of control 18 that the same constitutes a relief valve which is not only operative in either direction of fluid flow but is also capable of being adjusted in either direction of flow. Thus, assuming that the springs 39 are sufficiently compressed to require a fluid pressure of 200 p.s.i. to upseat the valve element 38 this pressure will be maintained in the exchanger 16 when the compressor 10 is running and the valve 15 is set as illustrated. If less heat or a lower temperature is desired at the exchanger 16, the screw 31 may be rotated by operator 32 to back off the force of the springs 39 thus controllably unloading the compressor and reducing the amount of heat which is pumped to the exchanger 16. To raise the temperature the screw 31 is manipulated to increase the compressive loading on the springs 39. I have found that the back pressure maintained in the exchanger 16 is indicative of the temperature of the refrigerant fluid being supplied to the exchanger. The compressor 10, of course, is a positive displacement machine whereby for any predetermined engine or driving speed the volume of fluid furnished the exchanger 16 remains constant. Consequently, the total amount of heat which is supplied to the exchanger 16 is a function of the back pressure maintained by the valve 37–39 for any given engine or drive speed. A singular advantage of the system of my invention is that the exchanger 16 may, upon proper setting of the control 32, be made to heat up very quickly upon starting of the vehicle engine whereby a waiting period is unnecessary. Of course, when the engine is at idle the fan 17 may be slowed or stopped under either manual or automatic control to avoid any blasting of cold air. The system disclosed herein is operable with any of the commercially available compressible refrigerants such as Freon 12.

When the valve 15 is set for cooling, the gaseous refrigerant from exchanger 16 is drawn through conduit 20 and valve 15 into the inlet conduit 13 of the compressor 10, and the compressed refrigerant from the compressor is now pumped through conduit 25 to the exchanger 26 which now functions as the condenser of the system. At idling or low engine speeds all the refrigerant condensed in exchanger 26 may pass through the restriction line 42 and the check valve 43 to effect maximum cooling at the exchanger 16 in relation to this speed. Likewise, if the screw 31 is adjusted to tightly compress the springs 39, all the refrigerant may yet pass through the line 42 at yet a higher engine speed but, of course, the cooling capacity will be increased due to the greater rate of flow. It is recognized that the low temperature obtained at the evaporator in a refrigerating system is a function of the pressure existent in the evaporator and the quantity of refrigerant which is being expanded into the low pressure. It should also be understood, of course, that refrigerant compressors, particularly of the kind used in motor vehicles, are commonly provided with a pressure-responsive bypass between outlet and inlet, not shown herein, to avoid damage to any part of the system because of the attainment of abnormally high pressures.

When it is desired to decrease the rate of cooling in the system of the present invention, it is only necessary to manipulate the screw 31 to decrease the compressive forces on the springs 32 which tend to center and hold closed the valve 38. When this is done some of the compressed liquefied refrigerant from exchanger 26 will bypass the restriction line 42 to raise both the pressure and temperature of the evaporator 16. A balance is thus obtained between the quantity of liquid refrigerant which discharges in bulk into the exchanger 16 and the quantity of liquid refrigerant which rapidly expands into a gaseous state upon issuing from the restriction line 42. The ratio of these quantities determines the temperature attained at the exchanger 16.

It should now be apparent that I have provided an improved combined heating and cooling system for the occupied space of a motor vehicle which accomplishes the objects initially set out above. Only one heat exchanger is required for the space, serving both for heating and cooling, and only one simplified temperature control device is necessary, also serving for both heating and cooling. The system of the invention represents a vast improvement and simplification over the heating and cooling systems now conventionally used for motor cars. I eliminate the conventional hot water hose lengths and their connections to the engine including valve and temperature control, and more space is made available within the passenger compartment of the car due to the requirement of but one heat exchanger within this compartment. Further, the system is an improvement over the conventional hot water heater since, as explained above, heat is made available at the inside exchanger 16 immediately upon starting of the engine and continues to be supplied even though the engine is operated at slow and idling speeds. Because of the mechanical source and conversion of the heat there is no dependence on outside weather and temperature conditions, the functioning of the heating system being dependent only on the mechanical power delivered to the compressor 10. Also, all these objects are accomplished by the use of simple and inexpensive control devices incorporated in the rather simple fluid circuit of the invention.

The invention herein resides in the general system above described since it should be obvious that various devices may be constructed to perform the functions of the valve 15 and of the controller 18. Reference should accordingly be had to the appended claims in determining the scope of the invention.

Having thus described my invention what I claim is:

1. A combined heating and cooling system for motor vehicles and the like comprising a power-driven refrigerant compressor, a first heat exchanger adapted to be installed within the space to be heated or cooled, a second heat exchanger adapted to be positioned outside said space, a reversing valve having ports connected to the inlet and outlet of said compressor and a pair of other ports connected, respectively, to a refrigerant port of said first exchanger and a refrigerant port of said second exchanger, conduit means interconnecting the other refrigerant ports of said exchangers and having means therein to yieldingly impede the flow of refrigerant in either direction, and a second conduit having a restricted passage and a series check valve in parallel with said conduit means to transfer liquid refrigerant from the said other of said refrigerant ports of said second exchanger to the other of said refrigerant ports of said first exchanger when said valve is set to discharge compressed refrigerant into said second exchanger.

2. Apparatus according to claim 1 further characterized in that said means to yieldingly impede the flow of refrigerant in said conduit means includes means to vary said impedance whereby the pressure differential existent in said exchangers may be varied in either direction.

3. A heating system for the passenger compartment of a motor vehicle and the like comprising in combination a heat exchanger adapted to be installed in said compartment, a refrigerant compressor adapted to be driven by the engine of the vehicle, conduit means for interconnecting the outlet of said compressor with one of the refrigerant ports of said exchanger, second conduit means for interconnecting the other refrigerant port of said exchanger with the inlet of said compressor, and means in said second conduit means to yieldingly impede the flow of refrigerant therethrough whereby a predetermined pressure may be maintained in said exchanger.

4. A system according to claim 3 further characterized in that said means to impede comprises a valve and a spring to hold said valve in closed position, and means to vary the force of said spring to thereby vary the resistance to flow through said valve.

5. Apparatus according to claim 1 further characterized in that said reversing valve comprises a valve body having a cylindrical chamber therein, diametrically opposing ports in said body intermediate the ends of said chamber communicating with said chamber and connected with said exchangers, ports in the end portions of said chamber communicating with the inlet and outlet, respectively, of said compressor, and a slanting seal rotatably mounted in said chamber for movement about the longitudinal cylindrical axis thereof and operative upon 180° rotation to connect one of said diametric ports to one of said compressor-connected ports while the other of said compressor-connected ports is connected to the other of said diametric ports and vice versa.

References Cited by the Examiner

UNITED STATES PATENTS

| 2,666,298 | 1/1954 | Jones | 62—160 |
| 2,801,827 | 8/1957 | Dolza | 62—324 |
| 2,806,358 | 9/1957 | Jacobs | 62—160 |
| 2,992,541 | 7/1961 | Sutton | 62—160 |
| 3,091,944 | 6/1963 | Van Den Berge | 62—324 |

WILLIAM J. WYE, *Primary Examiner.*